United States Patent [19]
Gleason

[11] Patent Number: 5,622,092
[45] Date of Patent: *Apr. 22, 1997

[54] SYSTEM FOR SIMULTANEOUSLY SETTING STROKE ON A CRANKSHAFT LATHE

[75] Inventor: William R. Gleason, Los Osos, Calif.

[73] Assignee: Sylvia Gleason, Monterey, Calif.

[ * ] Notice: The term of this patent shall not extend beyond the expiration date of Pat. No. 5,408,906.

[21] Appl. No.: 407,290

[22] Filed: Mar. 20, 1995

Related U.S. Application Data

[63] Continuation-in-part of Ser. No. 294,104, Aug. 22, 1994, Pat. No. 5,408,906.

[51] Int. Cl.⁶ .............................. B23B 5/18; B23B 33/00
[52] U.S. Cl. ............................ 82/106; 82/170; 29/888.08
[58] Field of Search .................. 82/106, 109; 29/888.08

[56] References Cited

U.S. PATENT DOCUMENTS

| | | |
|---|---|---|
| 3,789,709 | 2/1974 | Kendall et al. . |
| 3,896,690 | 7/1975 | Sedlar et al. . |
| 4,261,234 | 4/1981 | Berbalk . |
| 4,297,926 | 11/1981 | Russ et al. . |
| 4,305,689 | 12/1981 | Yamade et al. . |
| 4,779,495 | 10/1988 | Berbalk . |
| 4,895,057 | 1/1990 | Berstein et al. . |

OTHER PUBLICATIONS

AMC–Schou, Denmark Models of Crankshaft Grinding Macines Sales Brochure.

*Primary Examiner*—M. Rachuba
*Assistant Examiner*—Kenneth J. Hansen
*Attorney, Agent, or Firm*—Coudert Brothers

[57] ABSTRACT

A system is disclosed for simultaneously and more efficiently setting the stroke position of a crankshaft on a crankshaft lathe and a method of using the system in combination with the lathe for regrinding, building-up by welding or other machining of journals of the crankshaft. The system includes slide blocks and slides in operable combination with rack and pinion gears means for simultaneously positioning the crankshaft from a zero loading position to an offset position transverse to the longitudinal axis of the lathe.

9 Claims, 8 Drawing Sheets

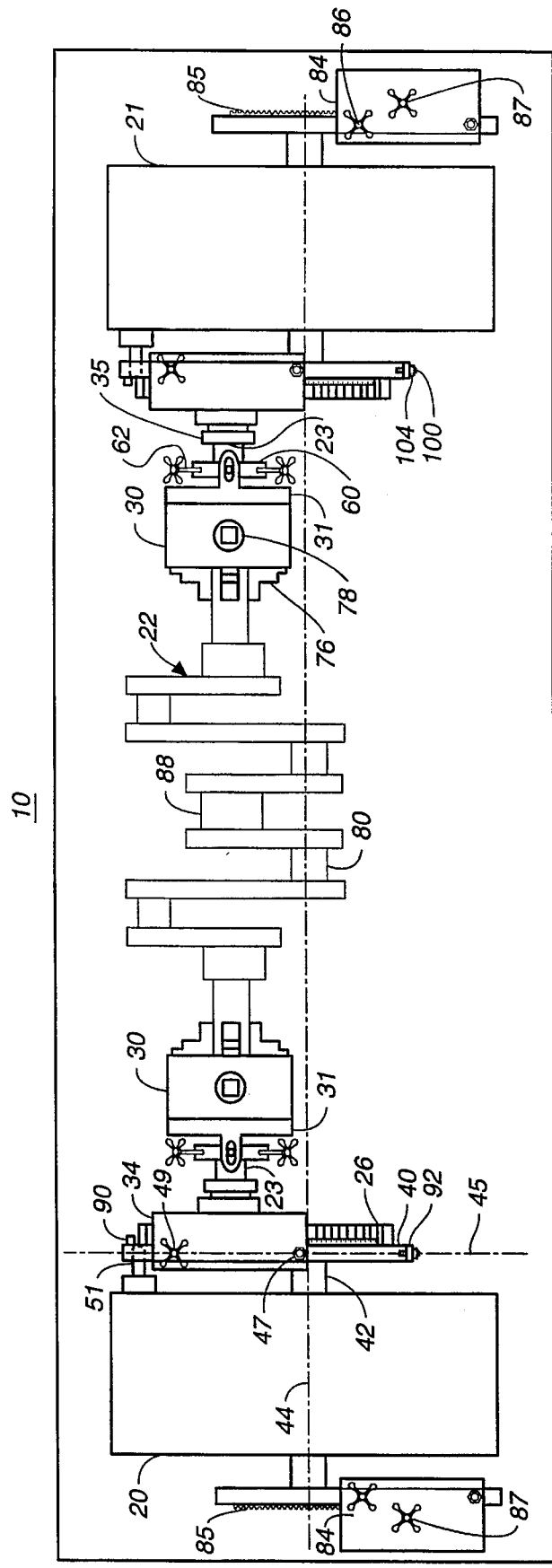
FIG._1

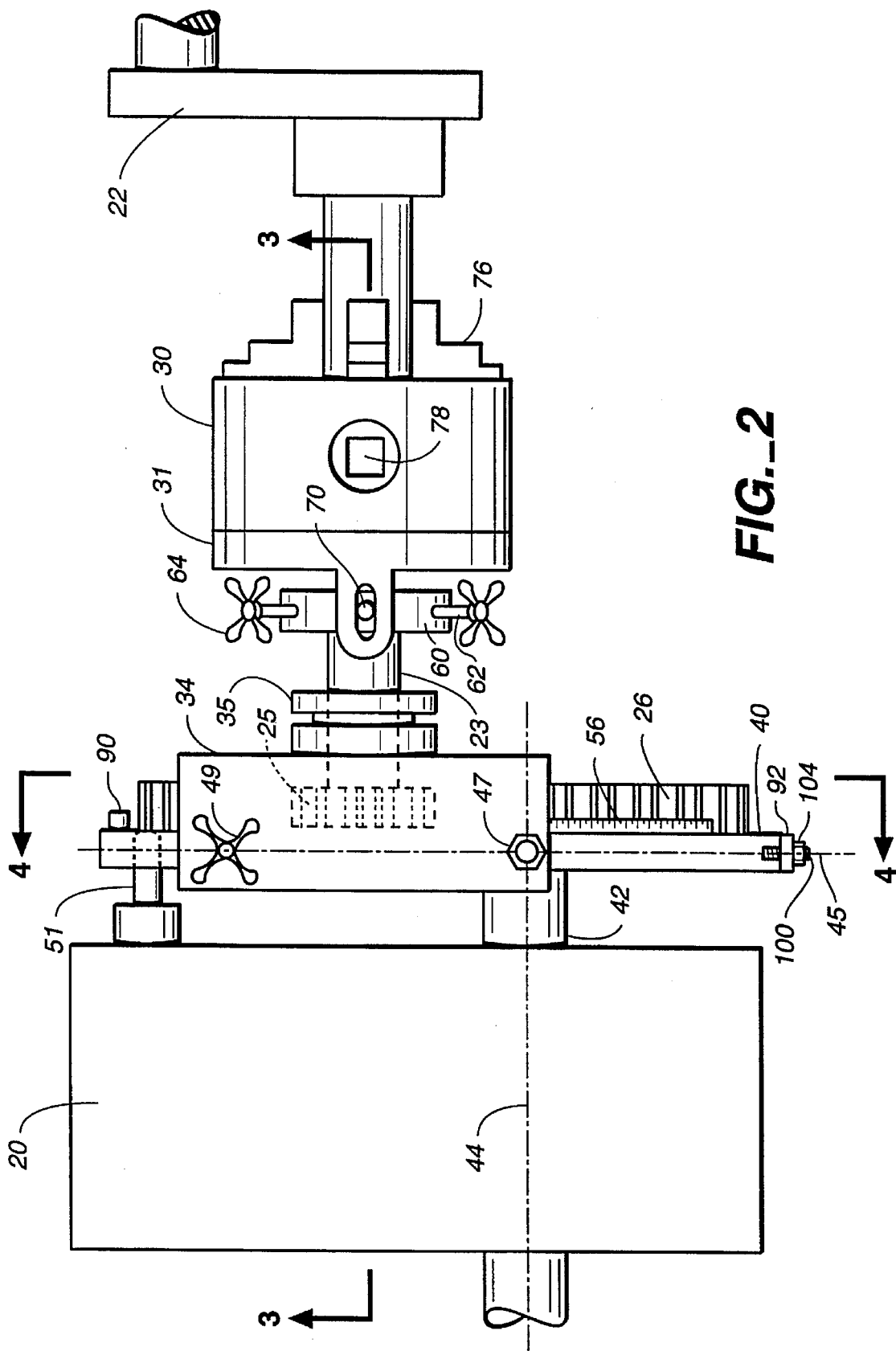
FIG._2

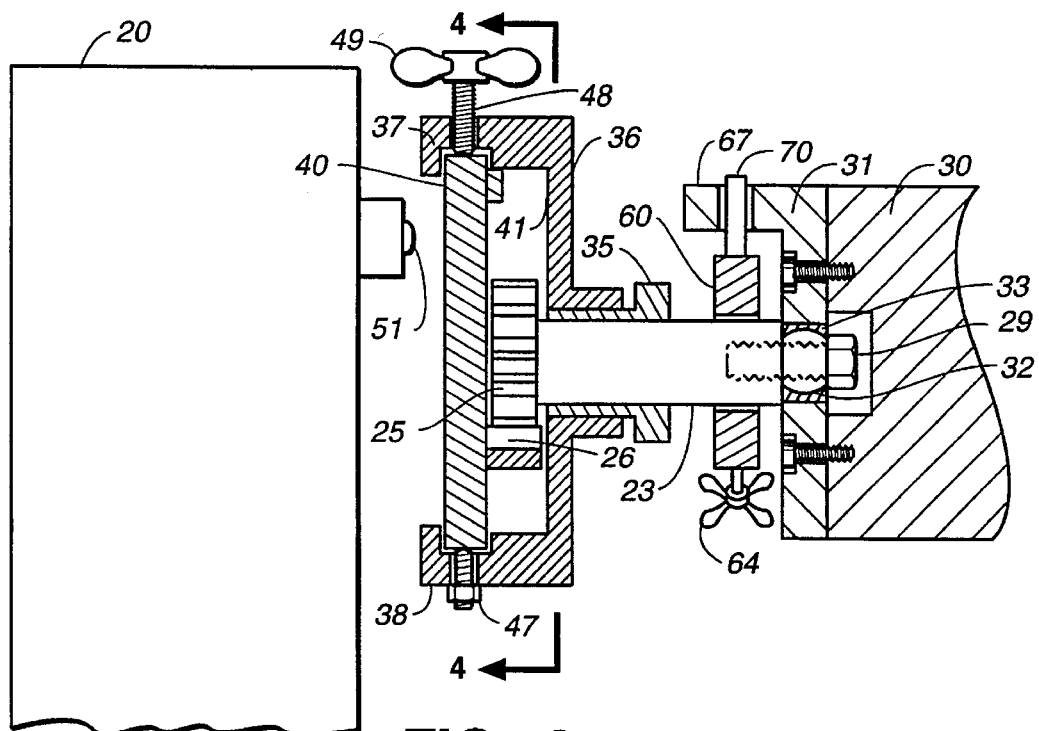
FIG._3
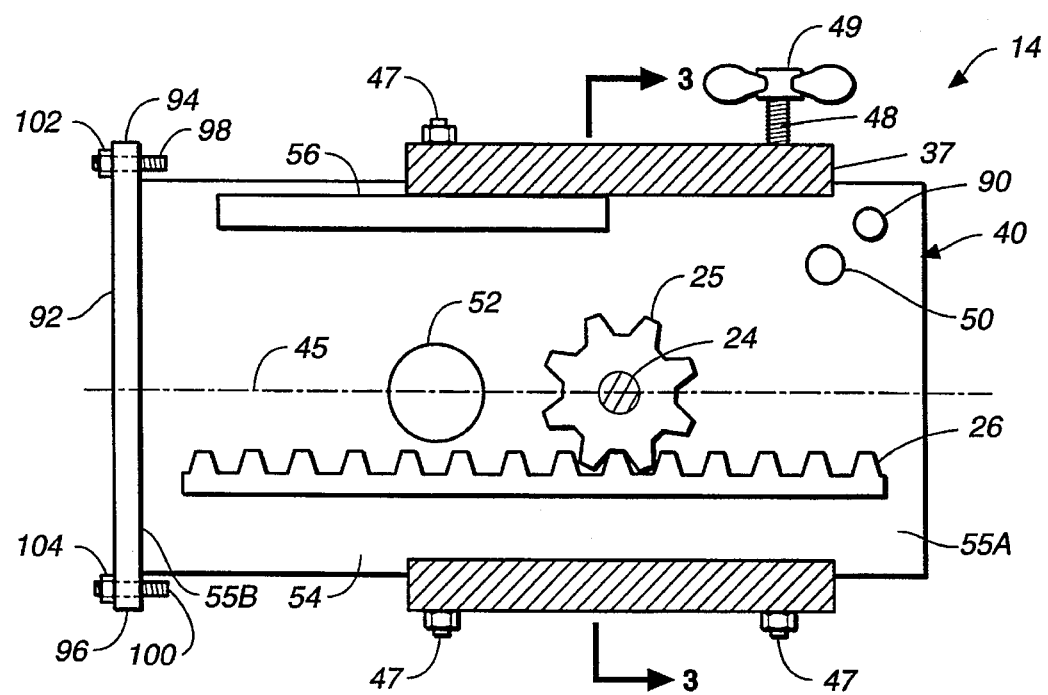
FIG._4

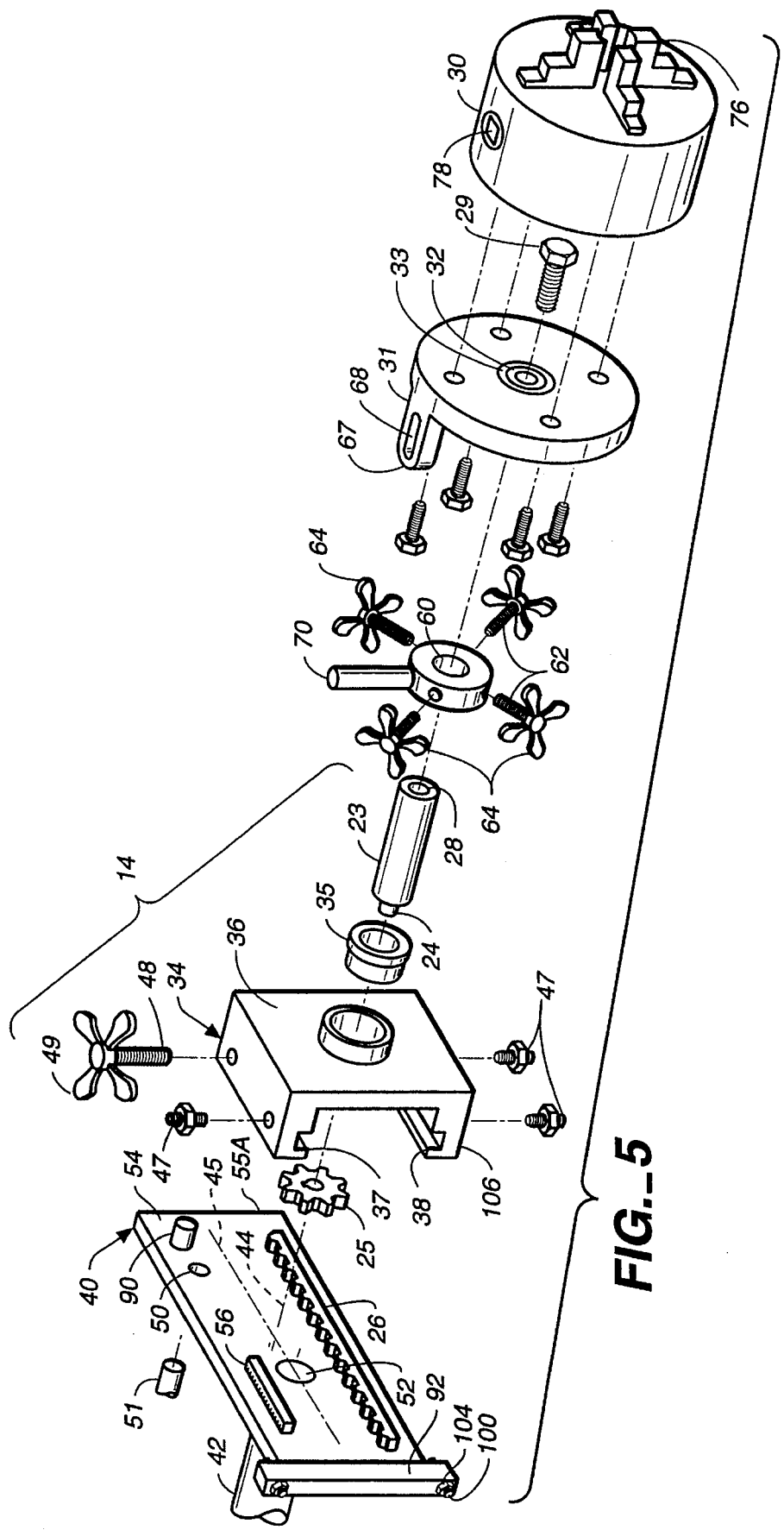
FIG._5

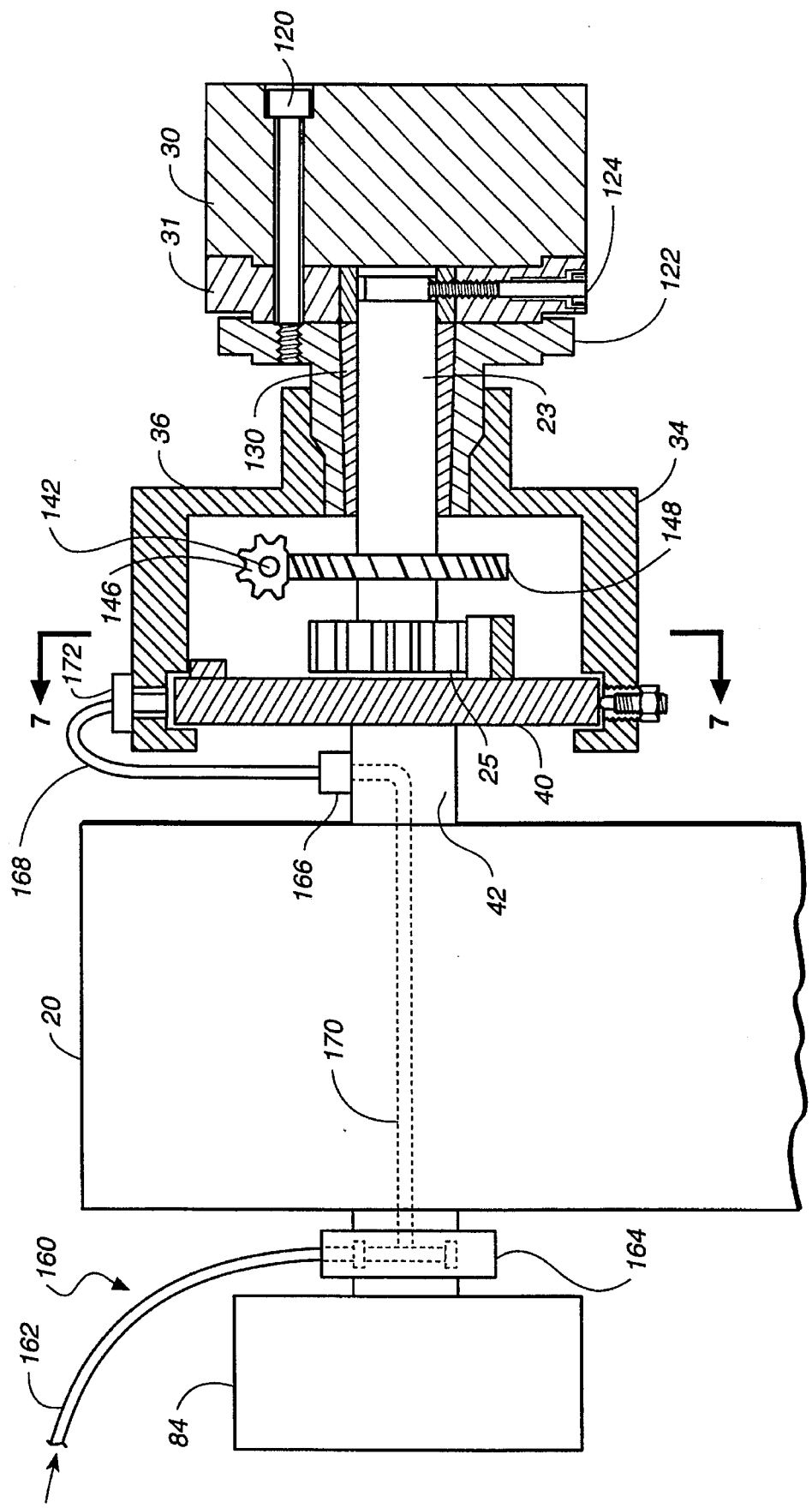
FIG._6

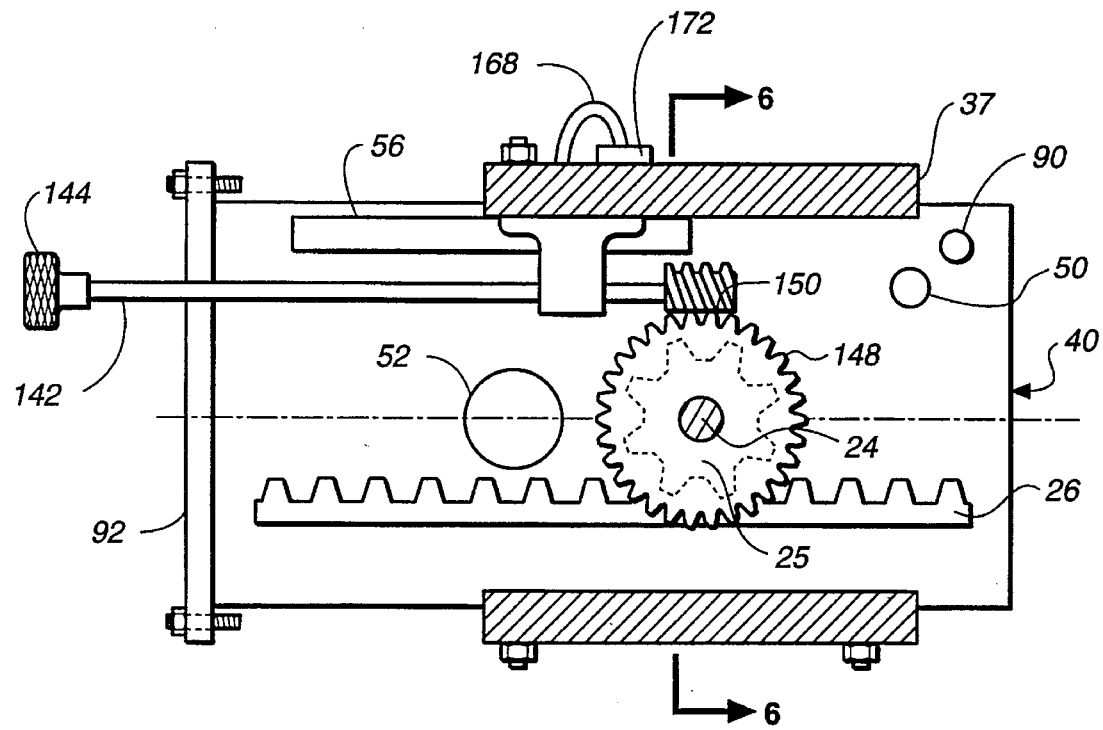
FIG._7
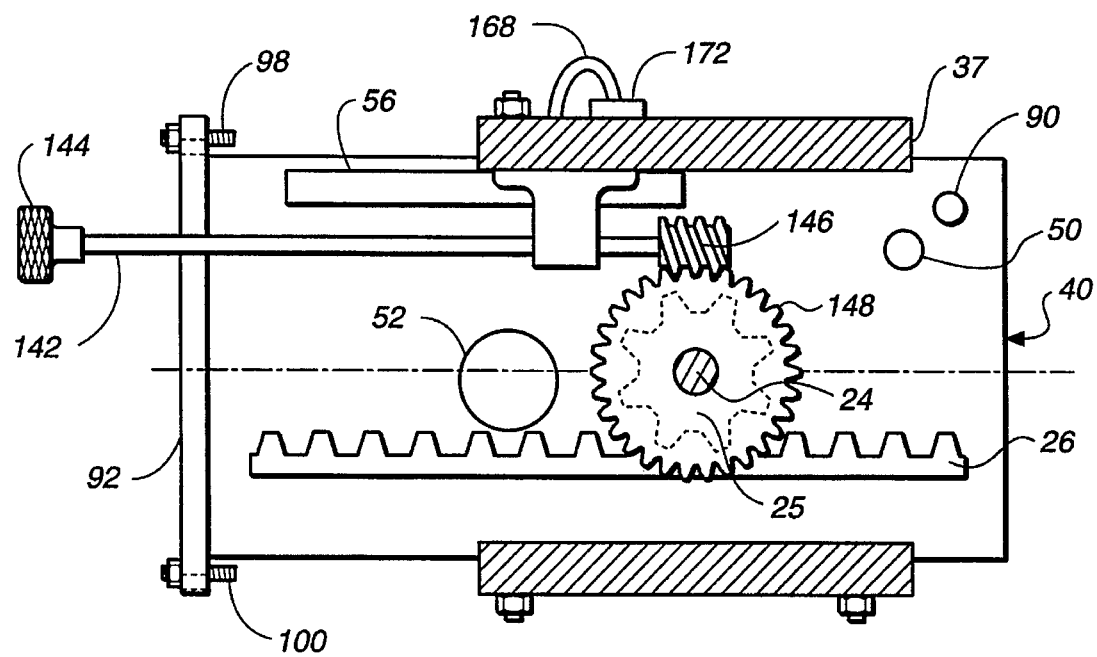
FIG._7A

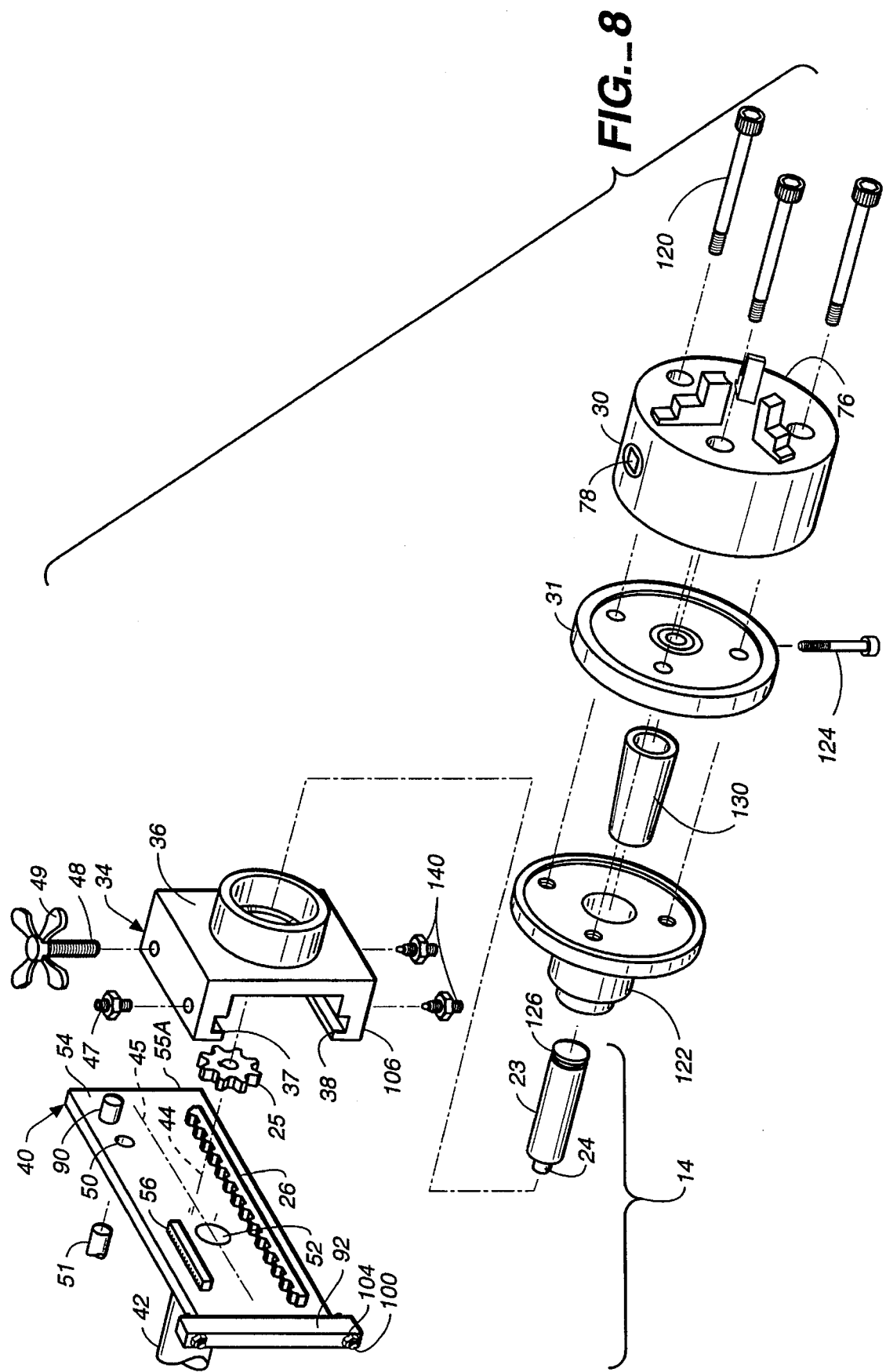

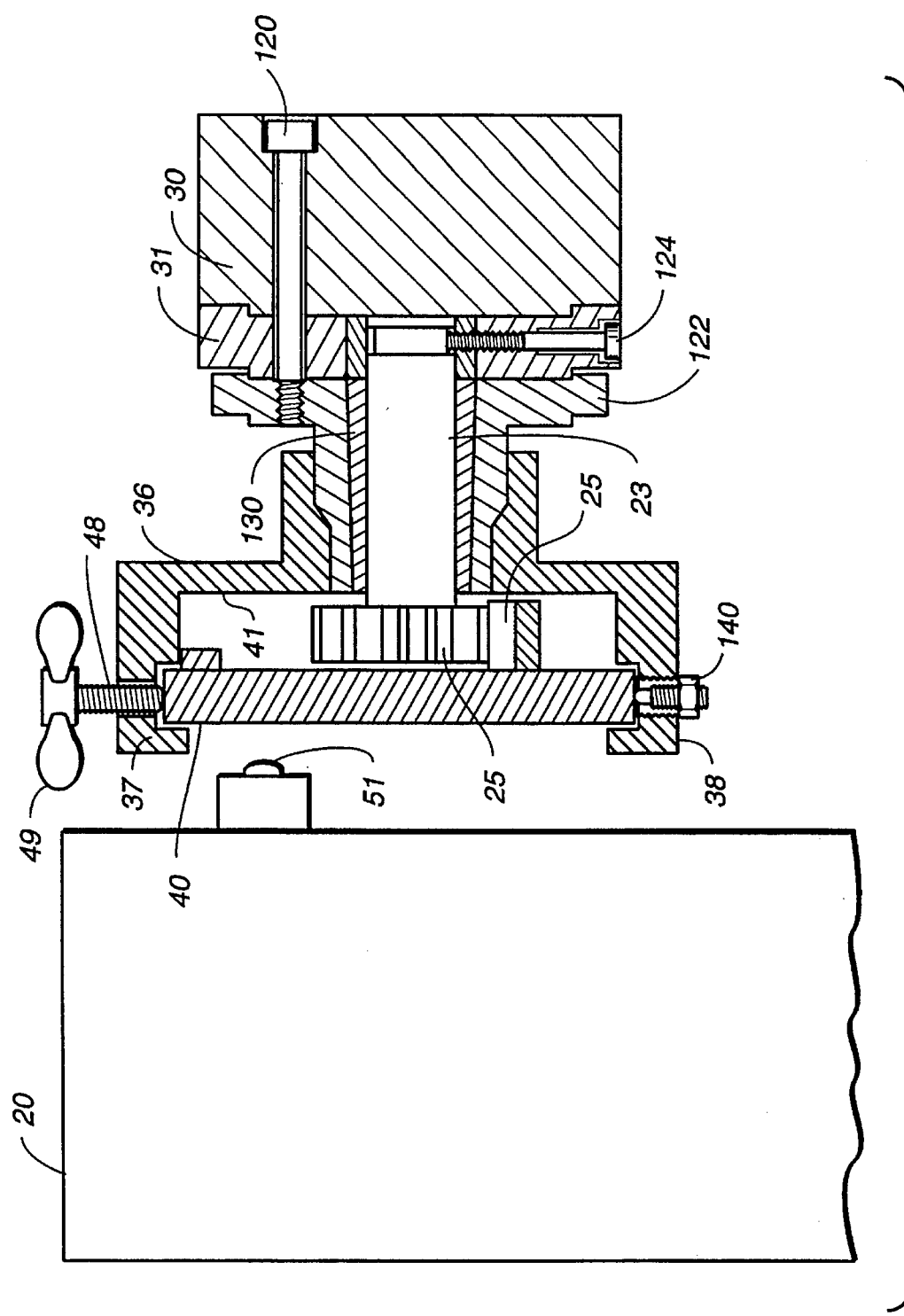
FIG._9

SYSTEM FOR SIMULTANEOUSLY SETTING STROKE ON A CRANKSHAFT LATHE

This application is a Continuation-in-Part of application U.S. Ser. No. 08/294,104, filed Aug. 22, 1994, now U.S. Pat. No. 5,408,906, issued Apr. 25, 1995 (Docket No. 52657)

FIELD OF THE INVENTION

The invention relates to a system for simultaneously and more efficiently setting the stroke position of a crankshaft on a crankshaft lathe and a method of using the system in combination with the lathe for regrinding, building-up by welding or other machining of journals of the crankshaft.

BACKGROUND OF THE INVENTION

Numerous improvements have been made to lathes used in machining crankshafts; see U.S. Pat. Nos. 3,789,709; 3,896,90; 4,261,234; 4,305,689; 4,779,495; and 4,895,057. However, none of the lathes disclosed in the foregoing patents are the type commonly used for rebuilding crankshafts of all types and sizes. A common problem exists for all such lathes during the rebuilding of crankshafts used for internal combustion engines and compressors. Because the crank journals or crankpins are offset from the main longitudinal axis of the crankshaft, the crankshaft must be positioned in the lathe so that the crankshaft moves in a circular rotary path. Consequently, the crankshaft must be readjusted and reclamped for each new offset or stroke position of the crankshaft. Each reclamping position requires time-consuming steps before the crankshaft is ready for machining.

The procedure involved to process various crankshaft journals using a typical prior art shop lathe are set forth below.

One example of such a typical prior art shop lathe suitable for regrinding an eight foot locomotive crankshaft, type V-16, having a twelve inch stroke, is Model K 2700 manufactured by AMC-Schou of Nordhavnsgade, Denmark. The thirty one steps required to set up the main journals of this machine are as follows:

(1) Engage manual locking pin on headstock to position chuck slide in vertical position.
(2) Loosen hand knob lock(s) on chuck slide.
(3) Set headstock chuck slide on zero stroke by rotating lead screw.
(4) Tighten headstock slide locking hand knob(s).
(5) Loosen headstock counterweight locking knob(s).
(6) Position headstock counterweight to minimum offset position by rotating lead screw.
(7) Tighten headstock counterweight locking hand knob(s).
(8) Engage manual locking pin or tailstock to position chuck slide in vertical position.
(9) Loosen hand knob lock(s) on tailstock chuck slide.
(10) Set tailstock chuck slide on zero stroke by rotating lead screw.
(11) Tighten tailstock slide locking hand knob(s).
(12) Loosen tailstock counterweight locking hand knob(s).
(13) Position tailstock counterweight to minimum offset position by rotating lead screw.
(14) Tighten tailstock counterweight locking hand knob(s).
(15) Hoist crankshaft into loading position.
(16) Adjust headstock chuck to receive snout of crankshaft.
(17) Adjust tailstock chuck to receive flange of crankshaft.
(18) Move tailstock into position and lock.
(19) Tighten tailstock chuck.
(20) Tighten headstock chuck.
(21) Disengage tailstock locking pin.
(22) Disengage headstock locking pin.
(23) Proceed to grind or weld appropriate main journal and thrust surfaces.
(24) Engage headstock locking pin.
(25) Engage tailstock locking pin.
(26) Support crankshaft with hoist.
(27) Loosen headstock chuck.
(28) Loosen tailstock chuck.
(29) Loosen tailstock lock.
(30) Back off tailstock.
(31) Remove crankshaft.

The eighty four additional steps required to set up the eight rod journals of this same machine are as follows:

(1) Loosen headstock chuck slide locking knob(s).
(2) Elevate headstock chuck slide block to proper stroke position indicated on scale by rotating leadscrew.
(3) Tighten headstock chuck slide locking knob(s).
(4) Loosen tailstock chuck slide locking knob(s).
(5) Elevate tailstock chuck slide block to proper stroke position indicated on scale by rotating leadscrew.
(6) Tighten tailstock chuck slide locking knob(s).
(7) Using hoist, position crankshaft snout into headstock chuck.
(8) Position crankshaft flange to fit into tailstock chuck.
(9) Move tailstock forward.
(10) Tighten headstock chuck.
(11) Tighten tailstock chuck.
(12) Tighten tailstock lock.
(13) Loosen tailstock chuck locking knob.
(14) Loosen headstock chuck locking knob.
(15) Rotate crankshaft until proper degree position is obtained.
(16) Tighten headstock chuck locking knob.
(17) Tighten tailstock chuck locking knob.
(18) Disengage tailstock locking pin.
(19) Disengage headstock locking pin.
(20) Loosen headstock counterweight locking knob(s).
(21) Adjust headstock counterweight by turning leadscrew to half the balance position.
(22) Disengage tailstock locking pin.
(23) Loosen tailstock counterweight locking knob(s).
(24) Adjust tailstock counterweight by turning leadscrew to hold the balance position.
(25) Tighten tailstock counterweight lock knob(s).
(26) Weld or grind connecting rod journal.
(27) Engage headstock locking pin.
(28) Engage tailstock locking pin.
(29) Loosen tailstock chuck locking knob.
(30) Loosen headstock chuck locking knob.

(31) Rotate next connecting rod to proper degree position.
(32) Tighten headstock chuck locking knob.
(33) Tighten tailstock chuck locking knob.
(34) Repeat steps (28)–(33) seven more times (equals 42 steps) until all connecting rod journals are processed.
(77) Engage headstock locking pin.
(78) Engage tailstock locking pin.
(79) Support crankshaft with hoist.
(80) Loosen headstock chuck jaws.
(81) Loosen tailstock chuck jaws.
(82) Loosen tailstock lock.
(83) Back tailstock away.
(84) Remove crankshaft.

Many complex pieces of equipment are available to accomplish the goal of setting the stroke on crankshaft lathes used to carry out repetitive machining of series-manufactured, special workpieces; see U.S. Pat. No. 4,297,926. However, for the average crankshaft rebuilding shop such pieces of equipment are too complex and costly and are not required for non-repetitive machining. The present invention provides the shop operator with a simple, inexpensive device or system for adding to existing lathes to overcome the problem of simultaneously and more efficiently setting the stroke position of the crankshaft.

SUMMARY OF THE INVENTION

The present invention describes in a crankshaft lathe having a headstock, a tailstock, holding chucks, holding chuck back plates, and main spindle shafts, the improvement which comprises headstock and tailstock rack and pinion gear means for simultaneously setting the stroke position of the crankshaft lathe. The pair of rack and pinion gear means convert the rotary motion of a crankshaft selected for machining into reciprocating motion transverse to the longitudinal axis of the lathe. This permits one to more easily vary the stroke position of the crankshaft from a zero crankshaft loading position in which the main spindle shaft for the headstock and tailstock are in alignment with the crankshaft along the longitudinal axis of the crankshaft lathe to an offset position transverse, preferably normal, to the longitudinal axis of the crankshaft. The headstock rack and pinion gear means is mounted on a headstock chuck spindle shaft, also called a mini-shaft to distinguish it from the main spindle shaft. The headstock rack and pinion gear means is operably attached to the headstock holding chuck back plates and operably connected between the headstock main spindle shaft and the headstock holding chuck back plate. Similarly, the tailstock rack and pinion gear means is mounted on a tailstock mini-shaft operably attached to the tailstock holding chuck back plates and operably connected between the tailstock main spindle shaft and holding chuck back plate. The holding chuck back plate is also known as the holding chuck adapter plate and serves the same purpose as that of the drive dog collar described in the parent patent application, now U.S. Pat. No. 5,408,906 (referred to herein as the parent application).

The headstock and tailstock rack and pinion gear means for simultaneously setting the stroke position of the crankshaft lathe comprises:

(a) headstock and tailstock slide blocks having guide rails and bushings distal the respective main spindle shafts and journalled on the headstock and tailstock mini-shafts;

(b) headstock and tailstock slideways, or slides, fixedly attached to the respective main spindle shafts and mounted within the guide rails of the respective slide blocks, each slide having a locking pin detent;

(c) headstock and tailstock locking pins removably positioned in each of the respective locking pin detents for locking the slides in a horizontal crankshaft loading position;

(d) headstock and tailstock pinion gear racks fixedly attached to the respective slides;

(e) headstock and tailstock pinion gears engaging the respective pinion gear racks and fixedly attached to the ends of the respective mini-shafts proximate the respective chuck back plates and journalled on the mini-shafts; and (f) headstock and tailstock slide block locking means operably mounted on and for locking each of the respective slide blocks along the respective slides after the desired crankshaft lathe stroke setting has been determined.

After the correct stroke setting has been determined, the slide block locking screw that is provided on the slide block is tightened against the rack and pinion means to prevent movement of the slide.

The disadvantages of the existing lathes for rebuilding crankshafts are overcome by the improved lathe of the present invention and the method of machining journals using such an improved lathe which:

(1) Allows an operator to more rapidly position or set the offset crankshaft rod bearing journals and to align them properly along the main spindle shaft longitudinal axis;

(2) Allows one to more easily determine the stroke position, i.e. determining when the rod journal is concentric with the longitudinal axis of the main shaft, of the rod journal to be reground or otherwise machined, by simply rotating the crankshaft;

(3) Is of simple, rugged construction of proven design; and (4) Allows one to deposit a uniform weld that does not require as much regrinding.

BRIEF DESCRIPTION OF THE DRAWINGS

FIG. 1 is a top view of a crankshaft lathe with the system of the invention of the parent application;

FIG. 2 is a more detailed view of the headstock end of the lathe with the system of the invention of the parent application;

FIG. 3 is a cross-sectional view of the system of the invention of the parent application, taken along line 3—3 of FIG. 4;

FIG. 4 is a cross-sectional view of the system of the present invention and of the parent application, taken along line 4—4 of FIG. 3;

FIG. 5 is an isometric view of each of the elements of the system of the invention of the parent application;

FIG. 6 s a cross-sectional view of the system of the present invention, taken along line 6—6 of FIG. 7;

FIG. 7 is a cross-sectional view of the system of the present invention, taken along line 7—7 of FIG. 6;

FIG. 7A is a cross-sectional view of the system of the present invention showing a vernier screw engaged in a worm gear;

FIG. 8 is an isometric view of each of the elements of the system of the present invention; and FIG. 9 cross-sectional view of an embodiment of the system of the invention of the parent application, similar to that taken along line 7—7 of FIG. 6.

DETAILED DESCRIPTION OF THE INVENTION

Referring now to FIGS. 1 through 5, crankshaft lathe 10 on stationary bed 12 is described in combination with dual systems 14 of the invention of the parent application. Headstock 20 is fixed on one end of stationary bed 12 along with a rotational motor (not shown) and tailstock 21 is fixed on the other end of stationary bed 12 and is movable along stationary bed 12 by conventional means, e.g., a rack and pinion gear, to accommodate crankshafts 22 of various lengths. With the exception of the motor and the tailstock rack and pinion gear, the headstock and tailstock assemblies are mirror images of each other. Each of the headstock and tailstock assembly components will be given the same reference numbers. Mini-shafts 23 of systems 14 have recessed first ends 24 which are fixedly attached to pinon gears 25 engageable with gear racks 26 and second ends 27 having threaded openings 28. Bolts 29 extending through holding chucks 30 and back plates 31 are mounted into openings 28 to join mini-shafts 23 to back plates 31 of holding chucks 30. Spherical bearings 32 within openings 33 of back plates 31 allow holding chucks 30 to tolerate a misalignment of crankshafts 22 with respect to mini-shafts 23. Slide blocks 34 has shoulder bushings 35 for receiving mini-shafts 23 on first faces 36 and guide rails 37 and 38 for receiving offset slides 40 on second faces 41 proximate main spindle shafts 42 when lathe 10 is in its zero stroke position of crankshaft 22. The longitudinal axis 44 is normal to the longitudinal axis or centerline 45 of lathe 10.

Set screw and jam nuts 47 have previously been adjusted against slides 40 to make mini-shafts 23 concentric with main spindle shafts 42. Further adjustment of these set screws is unnecessary during crankshaft set-up. Slide block locking fasteners 48, which can be simple set screws or threaded stock, are the only fasteners that require adjustment during the set-up of crankshaft 22. Fasteners 48 are threaded or otherwise pressed against offset slides 40 using hand knobs 49. Above longitudinal axis 45 of slides 40 are detents 50 for receiving locking pins 51 and openings 52 for fixedly attaching main spindle shafts 42 to slide 40. Locking pins 51 removably engageable in detents 50 are designed to hold slides 40 in a fixed, horizontal crankshaft 22 loading position. Pinion gear racks 26 are fixedly attached to fronts 54 of slides 40 and centered between right edges 55A and left edges 55B and adjacent to their lower longitudinal periphery of systems 14 shown in FIG. 4. Slide scales 56 are affixed adjacent to the upper left longitudinal periphery of fronts 54 of systems 14 shown in FIG. 4. Scale 56 permits one to select from an arbitrary set of numbers, i.e. 0 to 12, to register various fixed positions of pinion gear 25 along rack 26. Scale 56, in turn equates to various stroke settings of crankshaft lathe 10. Drive dog collars 60, used in conventional shop lathes, are positioned on mini-shafts 23 between gears 25 and back plates 31. A plurality, preferably four, of drive dog locking fasteners 62, e.g. threaded stock, having knobs 64 are threadably mounted within threaded opening 66 around the circumference of dog collars 60 for locking the latter to mini-shafts 23. Back plates 31 of holding chucks 30 has slotted brackets 67 having openings 68 through which drive pins 70, protruding from drive dog collars 60, pass to attach back plates 31 to drive dog collars 60.

During the initial operation of lathe 10 incorporating systems 14, locking pins 51 are engaged in headstock 20 and tailstock 21 to hold both slides 40 in a horizontal crankshaft position. Both slide blocks 36 are placed so that scale 56 indicates the 0 stroke position in which holding chucks 30 are in alignment with main headstock and tailstock spindle shafts 42. Crankshaft 22 is then loaded into holding chucks 30 and chuck jaws 76 are tightened by means of a conventional chuck wrench with a modified handle (not shown) in socket 78. Drive dog collar knobs 64 are rotated to loosen locking fasteners 62 and crankshaft 22 is rotated with the modified chuck wrench to determine its stroke dimension, if this is not known. The stroke dimension is determined by using a conventional stroke indicator gauge (not shown). Locking fasteners 62 on drive dog collar 60 are tightened and slide block locking fasteners 48 are loosened. Crankshaft 22 is again rotated with the modified chuck wrench until the desired stroke position as indicated on scale 56 is reached for the machining of, for example, rod journals 80. Specifically, crankshaft 22 is rotated so that the stroke dimension previously obtained for rod journals 80 is shown on scale 56. More specifically, as crankshaft 22 rotates, pinion gear 25 rotates causing mini-shaft 23 to travel laterally along longitudinal axis 46 of slide 40. The specific location of the center of gear 25 along the length of slide 40 in relation to longitudinal axis 44 of main spindle shaft 42 is shown on slide scale 56. When the desired stroke position is reached, slide block locking fasteners 48 are tightened. Drive dog locking fasteners 62 are loosened and crankshaft 22 is rotated with the modified chuck wrench to obtain the proper degree using a conventional degree gauge (not shown) for rod journals 80 to be worked upon and then fasteners 62 are retightened. Crankshaft 22 is held by locking pins 58 in detents 50 while counterweights 84 are roughly adjusted by means of a conventional racks 85 and pinion gears (not shown) using hand knobs 86. Locking pins 51 are retracted from detent 50 and crankshaft 22 is allowed to reach equilibrium. Racks 85 and pinion gears are furthered adjusted to bring crankshaft 22 to a true balanced position and knobs 87 are tightened. The entire lathe assembly of counterweights 84, spindle shafts 42, slide blocks 34, mini-shafts 23, holding chuck 30 and crankshaft 22 are now fixed in position as one unit and are free to rotate smoothly in a balanced position when the lathe motor is turn on and the machining operation is begun.

The procedure set forth in the above paragraph is reversed for a different stroke position, i.e. for working on main bearing journal 88 of crankshaft 22. Locking pins 51 are engaged into detents 50, slide blocks 34 are released to allow pinion gear 25 to travel along rack 41 causing crankshaft 22 to rotate back to the zero stroke position and crankshaft 22 is secured. Balance counterweights 84 are returned to their zero position, secured in place and locking pins 58 are disengaged from detents 50.

FIGS. 1, 2, 4 and 5 illustrate safety stops to prevent slide blocks 34 from traveling off racks 26 for use with systems 14 of the parent invention. Fixed position end stops 90 are welded or otherwise permanently attached to the upper right periphery of fronts 54 of systems 14 shown in FIG. 4. End stops 90 establish the extreme right position that gears 25 can travel on rack 26 and for scales 56. Straps 92 having upper ends 94 and lower ends 96 are welded or otherwise permanently attached to left edges 55B of slides 40. Adjustable end stop screws 98 and 100 are threaded into adjacent upper ends 94 and lower ends 96, respectively. Lock nuts 102 and 104 are threaded onto the left sides of straps 92 parallel to longitudinal axis 45 and adjacent upper ends 94 and lower ends 96, respectively. Prior to using lathe 10 with systems 14, pinion gears 25 are adjusted along longitudinal axis 45 until the last notches on the left end of racks 26 are reached. End stop screws 98 and 100 are tightened to contact left edges 106 of slide blocks 34. This setting becomes the extreme left position on scales 56.

FIGS. 6, 7, 7A, 8 and 9 illustrate the slight differences between the lathe of the present invention and that of the parent application. The only basic difference is in place of using drive dog collars 60 of the parent application, holding chuck back plates 31 are modified to serve the same function as drive dog collars 60. A minor difference includes the fact that FIG. 8 shows holding chucks 30 with conventional three chuck jaws 76 in place of the four chuck jaws 76 shown in FIG. 5. The other differences include one of a variety of methods that one skilled in the art can use for attaching holding chuck back plates 31 to holding chucks 30. FIGS. 6, 8 and 9 show one such method in which chuck mounting bolts 120 connecting holding chucks 30 to holding chuck back plates 31 and shoulder bushings 122. In place of the drive dog collar knobs 64 for locking dog collars 60 to mini-shafts 23, lock bolt 124 can be tightened against undercut grooves 126 of mini-shafts 23. In some instances, depending on the clearances often involved in retrofitting the system present invention to existing lathes, including both grinders and welders, tapered bushings 130 are used as shown in FIGS. 6, 8 and 9. Such bushings would not be required when the systems of the present invention are designed into the lathes at the time of their manufacture. One of set screws 47 on the bottom as shown in FIG. 8 can be replaced by springloaded set screw 140. The latter is considered to be the preferred means for adjustment of slides 40 to make shafts 23 concentric with main spindle shafts 42.

FIGS. 6, 7 and 7A show one of a variety of methods that can be used to fine tune the setting of the desired stroke position after the steps have been taken as set forth above. Rod 142 is shown having vernier knob 144 fixedly attached to one end and first worm gear 146 mounted to the other end for engagement with second worm gear 148. First worm gear 146 has flat surface 150 for disengaging with second worm gear 148.

FIGS. 6, 7 and 7A shows that one of methods for fine adjustments for moving slide 40 within slide block 34 is to use pneumatic air-assisted cross-slide attachment 160. Attachment 160 comprises main pneumatic air supply tube 162 from air supply (not shown) connected to rotary air couplings 164 on headstock and tailstock spindle shafts 42 on one side of headstock and tailstock 20 distal holding chucks 30. Each of shafts 42 is internally ported through tube 170 to lift each slide block 40 within slide block 34 via air coupling 166, pneumatic air supply tube 168 and air coupling 172 approximately 0.001 inch. This fine adjustment method is used after the procedures set forth above to set the stroke.

Substantially the same basic procedures set forth above for operating the system of the parent application are used during the operation of the system of the present invention. The only basic difference is the loosening and tightening of stroke tightening means, shown in FIGS. 6, 8 and 9 as lock bolts 124 within openings in holding chuck backing plates 31, instead of locking fasteners 62 on drive dog collars 60. There may be other minor differences in the operation of the system of the present invention from those described in the parent application in the event a vernier means and/or pneumatic air-assisted cross-slide attachments of the type described above for making fine adjustments are added to the system of the present invention. Operation of all such means for making fine adjustments to the present system are well known to those skilled in the art.

An effort has been made to estimate the amount of savings in the time for an operator to more rapidly position or set the offset crankshaft main bearing journals and rod bearing journals in the lathe of this invention in comparison to the specific steps numbers for positioning and setting the crankshaft journals in the prior art lathe, the AMC-Schov's lathe, referred to under the Background of the Invention above. It has been found that steps (3) and (10) for the main bearing journals take 10 minutes in the prior art lathe. In the lathe of the present invention, steps (3) and (10) are substituted by a single step. An operator uses a single step of simply rotating the crankshaft with a modified chuck handle. This causes the headstock and tailstock slide blocks to simultaneously move to the proper stroke setting of the lathe of this invention for a main bearing journals within 3 seconds, for a net savings of approximately 10 minutes. Steps (2) and (5) for the rod bearing journals also take 10 minutes in the prior art lathe. The same single step is used by the operators of the lathe of this invention for both main and rod journals to result in a total of 20 minutes of time saved for setting both the main and rod journals. It has been found that steps (26) through (31) and steps (7) and (12) for the main and rod journals, respectively take a total of 30 minutes. In the lathe of the present invention, all of these steps can be eliminated. In the present lathe, the crankshaft does not have to be removed when the main journals are completed and the rod journals are to be machined. This results in a total savings of another 30 minutes. It has been found that steps (6) and (13) and steps (21) through (24) for the main and rod journals, respectively take a total of 25 minutes for the prior art lathe. The lathe of this invention uses a rack and pinion hand knob to set the counterweights instead of the counterweight lead screws of the AMC-Schou lathe. One turn of the rack and pinion hand knob moves the counterweights 3 inches compared with the necessity of 20 turns for the counterweight lead screws to move the counterweights one inch. Therefore, the savings in time for the counterweight settings of the lathe of the present invention over the AMC-Schou lathe is a total of another 25 minutes. The overall setup and positions time saving for this comparison is approximately 75 minutes for each crankshaft having eight rod journals. Similar savings of set up time will be achieved over other prior art shop lathes.

Without departing from the spirit and scope of this invention, one of ordinary skill in the art can make many other changes and modifications to the either the rack and pinion system of this invention or its combination with a conventional shop crankshaft lathe to adapt it to specific usages and conditions. The threaded stock and set screws used in the preferred embodiment can be replaced by other types of fasteners well known to those skilled in the art. As such, these changes and modifications are properly, equitably, and intended to be, within the full range of equivalents of the following claims.

What is claimed is:

1. In a crankshaft lathe having a headstock, a tailstock and a holding chuck, headstock holding chuck back plate, tailstock chuck back plate, and a main spindle shaft operably connected to each of said headstock and said tailstock, a system for simultaneously setting the stroke position of a crankshaft comprising:

(a) headstock mini-shaft, said mini-shaft having a first end operably connected to the headstock holding chuck back plate and a second end;

(b) headstock rack and pinion gear means mounted on the second end of said headstock mini-shaft;

(c) tailstock mini-shaft, said minishaft having a first end operably connected to the tailstock holding chuck back plate and a second end;

(d) tailstock rack and pinion gear means mounted on the second end of said tailstock mini-shaft;

said headstock and tailstock rack and pinion means for simultaneously positioning the crankshaft from a zero loading position in which the main spindle shaft for the headstock and tailstock are in alignment with the crankshaft along the longitudinal axis of the crankshaft lathe to an offset position transverse to the longitudinal axis.

2. The system of claim 1 wherein each of the first ends of said mini-shafts is respectively on each of said holding chuck back plates and wherein stroke tightening means within said holding chuck back plates for tightening each of said holding chuck back plates to the first ends of said mini-shaft.

3. The system of claim 1 wherein the headstock and tailstock rack and pinion gear means are respectively operably mounted within headstock and tailstock offset slide and slide block means having a longitudinal axis transverse to the longitudinal axis of the crankshaft lathe.

4. The system of claim 1 wherein the headstock and tailstock rack and pinion gear means for simultaneously setting the stroke position of the crankshaft comprises:

(a) headstock and tailstock slide blocks and a bushing journalled on each of said headstock and tailstock mini-shafts;

(b) headstock and tailstock slides fixedly attached to the respective main spindle shafts and mounted within the guide rails of the respective slide blocks, each slide having a locking pin detent;

(c) headstock and tailstock locking pins removably positioned in each of the respective locking pin detents for locking the slides in a horizontal crankshaft loading position;

(d) headstock and tailstock pinion gear racks fixedly attached to the respective slides;

(e) headstock and tailstock pinion gears engaging the respective pinion gear racks and fixedly attached to the second ends of the respective mini-shafts; and (g) headstock and tailstock slide block locking means operably mounted on and for locking each of the respective slide blocks along the respective slides after the desired crankshaft lathe stroke setting has been reached.

5. In a crankshaft lathe having a headstock, a tailstock and a holding chuck, headstock holding chuck back plate, tailstock chuck back plate, and a main spindle shaft operably connected to each of said headstock and said tailstock, a system for simultaneously setting the stroke position of a crankshaft comprising:

(a) mini-shafts each having a first end operably journalled within an opening in each of said holding chuck back plates and having a second end for receiving a pinion gear;

(b) slide blocks each having a first face distal each of said main spindle shafts and a second face proximate each of said main spindle shafts and having its longitudinal axis transverse to the longitudinal axis of the lathe, each of said first faces having a bushing journalled on said mini-shafts and each of said second faces having longitudinal guide rails;

(c) offset slides mounted within said guide rails of said slide blocks, each slide having a front proximate each of said mini-shafts and having a cylindrical opening fixedly mounted on each of said main spindle shafts and a locking pin detent, said opening and said detent being centered along the longitudinal axis of the slide;

(d) pinion gear racks attached along the longitudinal axes of the front of said slides;

(e) stroke tightening means for locking said mini-shafts within each of the openings in said headstock and tailstock chuck backing plates;

(f) pinion gears fixedly attached to each of the second ends of said mini-shafts;

(g) locking pins removably positioned in each of said detents for holding said slide in a horizontal crankshaft loading position; and (h) slide block locking means operably mounted on each of said slide locking blocks to lock each of said blocks in place after setting the desired crankshaft stroke.

6. The system of claim 5 wherein safety stops are fixedly attached to each of said offset slides to prevent slide blocks from traveling off pinion gear racks.

7. The system of claim 6 wherein each of said safety stops comprise a set of fixed end stops adjacent one edge of said offset slide and an adjustable end stop at an opposite edge of said offset slide.

8. The system of claim 5 wherein vernier gear means are mounted adjacent each of said pinion gears for fine tuning of the stroke position setting.

9. The system of claim 8 wherein each of said vernier gear means comprises a shaft attached to each of said headstock and said tailstock, a worm on each of said shafts, a worm gear in engagement with said worm, and a vernier knob on each of said shaft for making the final adjustment of the stroke position.

\* \* \* \* \*